United States Patent
Miyabe

(10) Patent No.: US 10,452,326 B2
(45) Date of Patent: Oct. 22, 2019

(54) INFORMATION PROCESSING APPARATUS, INFORMATION PROCESSING METHOD, AND NON-TRANSITORY COMPUTER-READABLE STORAGE MEDIUM

(71) Applicant: Kazuhiro Miyabe, Kanagawa (JP)

(72) Inventor: Kazuhiro Miyabe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/007,346

(22) Filed: Jun. 13, 2018

(65) Prior Publication Data

US 2019/0012121 A1    Jan. 10, 2019

(30) Foreign Application Priority Data

Jul. 6, 2017   (JP) .................................. 2017-132794
Aug. 10, 2017  (JP) .................................. 2017-155653

(51) Int. Cl.
*G06F 3/12*     (2006.01)
*G06K 15/02*    (2006.01)

(52) U.S. Cl.
CPC .......... *G06F 3/1217* (2013.01); *G06F 3/1231* (2013.01); *G06F 3/1232* (2013.01)

(58) Field of Classification Search
None
See application file for complete search history.

(56) References Cited

U.S. PATENT DOCUMENTS

| 6,437,869 B1* | 8/2002 | Matoba | G06F 3/1207 |
| | | | 358/1.11 |
| 9,811,390 B1* | 11/2017 | Ma | G06F 9/5038 |
| 2002/0048034 A1* | 4/2002 | Matoba | G06F 3/1207 |
| | | | 358/1.13 |
| 2007/0156784 A1* | 7/2007 | Yamamoto | H04L 41/00 |

(Continued)

FOREIGN PATENT DOCUMENTS

| JP | 7-271527 | 10/1995 |
| JP | 2011-191988 | 9/2011 |

(Continued)

*Primary Examiner* — Beniyam Menberu
(74) *Attorney, Agent, or Firm* — Harness, Dickey & Pierce, P.L.C.

(57) ABSTRACT

An information processing apparatus includes a memory and circuitry. The circuitry is configured to send a request for status information to an image processing apparatus. The status information indicates a status of the image processing apparatus. The circuitry is configured to acquire the status information from the image processing apparatus in response to the request. The circuitry is configured to store, in the memory, the status information acquired, in association with identification information. The circuitry is configured to retrieve the identification information from the memory when a standby time elapses. The circuitry is configured to determine whether the identification information retrieved satisfies a certain condition. The circuitry is configured to display, on a display, a screen indicating the status of the image processing apparatus based on the status information acquired, based on a determination that the identification information retrieved satisfies the certain condition.

20 Claims, 11 Drawing Sheets

(56) References Cited

U.S. PATENT DOCUMENTS

| | | | | |
|---|---|---|---|---|
| 2009/0040551 A1* | 2/2009 | Ohara | ............ | G06F 3/1229 |
| | | | | 358/1.15 |
| 2013/0050748 A1* | 2/2013 | Tsuchitoi | ......... | G06F 3/1207 |
| | | | | 358/1.15 |
| 2014/0009774 A1 | 1/2014 | Miyabe | | |
| 2014/0280724 A1* | 9/2014 | Kamma | ............ | H04L 67/10 |
| | | | | 709/217 |
| 2014/0372738 A1* | 12/2014 | Mersh | ............ | G06F 21/575 |
| | | | | 713/2 |
| 2015/0046556 A1* | 2/2015 | Takenouchi | ...... | H04L 67/025 |
| | | | | 709/207 |
| 2015/0124288 A1* | 5/2015 | Tajima | ............ | G06F 3/1203 |
| | | | | 358/1.15 |
| 2016/0088175 A1* | 3/2016 | Suzuki | ............ | H04N 1/00477 |
| | | | | 358/1.15 |
| 2016/0088196 A1* | 3/2016 | Suzuki | ............ | H04N 1/6097 |
| | | | | 358/1.9 |

FOREIGN PATENT DOCUMENTS

| | | |
|---|---|---|
| JP | 2015-114878 | 6/2015 |
| JP | 2016-021157 | 2/2016 |

* cited by examiner

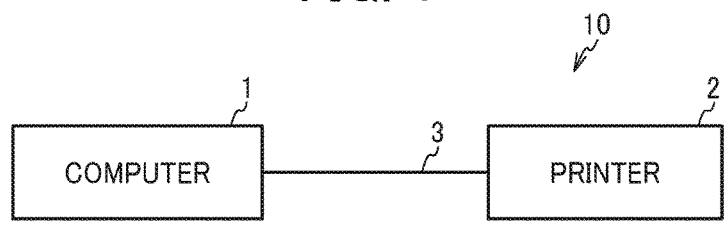
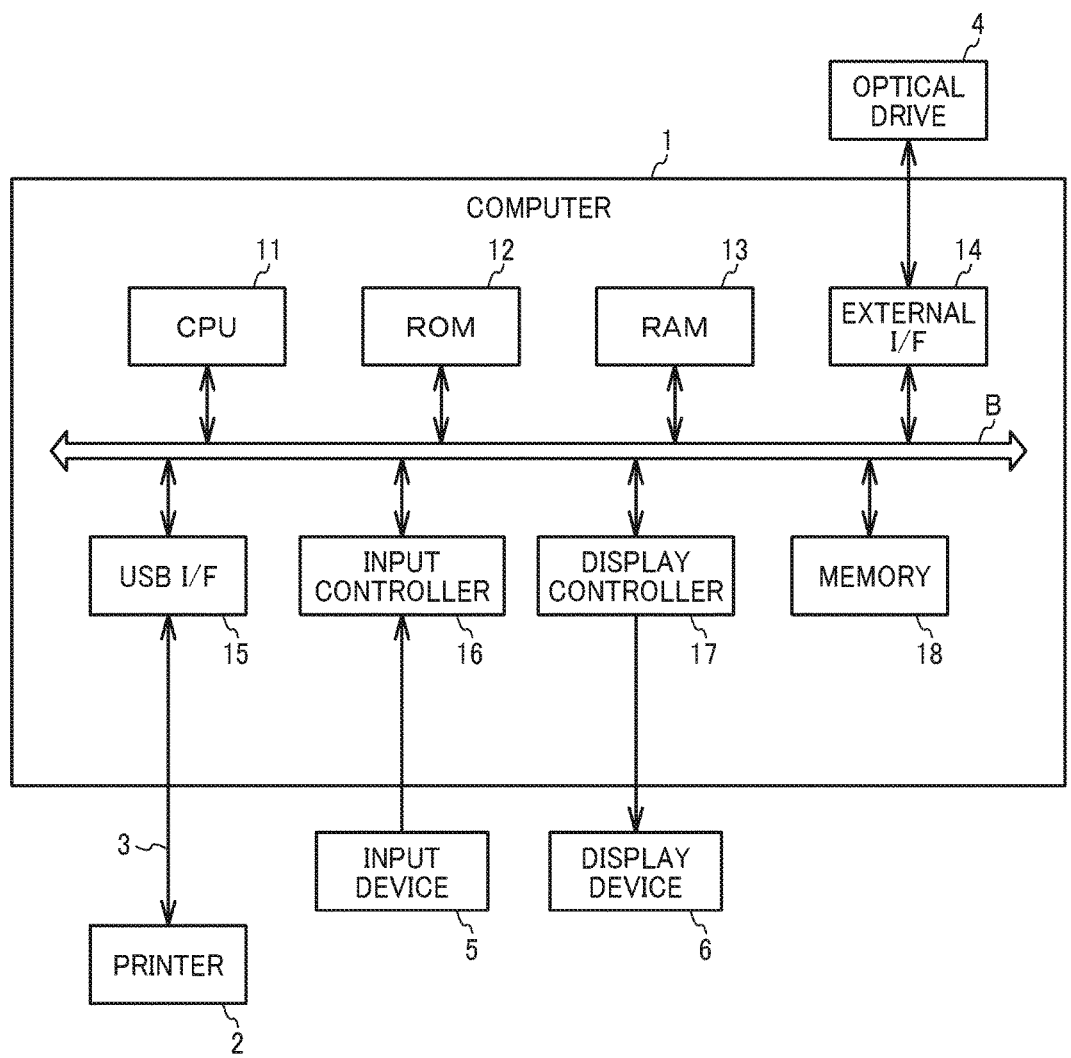

FIG. 9

| KEY | VALUE |
|---|---|
| BidiRequestID | 98573409857 |

FIG. 10

```
Option
        DuplexUnit=ON
        HardDisk=ON
        Memory=256MB
InputTray
        Tray=A4
        Bypass=A5
```

INFORMATION PROCESSING APPARATUS, INFORMATION PROCESSING METHOD, AND NON-TRANSITORY COMPUTER-READABLE STORAGE MEDIUM

CROSS-REFERENCE TO RELATED APPLICATIONS

This patent application is based on and claims priority pursuant to 35 U.S.C. § 119(a) to Japanese Patent Application Nos. 2017-132794, filed on Jul. 6, 2017, and 2017-155653, filed on Aug. 10, 2017, in the Japan Patent Office, the entire disclosure of each of which is hereby incorporated by reference herein.

BACKGROUND

Technical Field

Embodiments of the present disclosure relate to an information processing apparatus, an information processing method, and a non-transitory computer-readable storage medium storing a computer-readable product that causes an information processing apparatus to execute a method for processing information.

Related Art

Information processing apparatuses often transmit an acquisition request to an image processing apparatus (as a controlled apparatus) to acquire from the image processing apparatus status information indicating a status of the image processing apparatus. For example, such information processing apparatuses may acquire the status information of the image processing apparatus by asynchronous bidirectional communication.

When the status of the image processing apparatus is changed, the status information is updated in the image processing apparatus. The asynchronous bidirectional communication may hamper the information processing apparatuses to acquire the latest status information.

SUMMARY

In one embodiment of the present disclosure, a novel information processing apparatus includes a memory and circuitry. The circuitry is configured to send a request for status information to an image processing apparatus. The status information indicates a status of the image processing apparatus. The circuitry is configured to acquire the status information from the image processing apparatus in response to the request. The circuitry is configured to store, in the memory, the status information acquired, in association with identification information. The circuitry is configured to retrieve the identification information from the memory when a standby time elapses. The circuitry is configured to determine whether the identification information retrieved satisfies a certain condition. The circuitry is configured to display, on a display, a screen indicating the status of the image processing apparatus based on the status information acquired, based on a determination that the identification information retrieved satisfies the certain condition.

Also described are novel method for processing information and non-transitory computer-readable storage medium storing a computer-readable product that causes an information processing apparatus to execute a method for processing.

BRIEF DESCRIPTION I/F THE DRAWINGS

A more complete appreciation of the embodiments and many of the attendant advantages and features thereof can be readily obtained and understood from the following detailed description with reference to the accompanying drawings, wherein:

FIG. 1 is a schematic block diagram of a printing system according to an embodiment of the present disclosure;

FIG. 2 is a block diagram illustrating a hardware configuration of a computer in the printing system of FIG. 1;

FIG. 9 is a diagram illustrating an example of a request ID;

FIG. 10 is a diagram illustrating an example of the apparatus information or response data;

The accompanying drawings are intended to depict embodiments of the present disclosure and should not be interpreted to limit the scope thereof. Also, identical or similar reference numerals designate identical or similar components throughout the several views.

DETAILED DESCRIPTION

Figure 3:
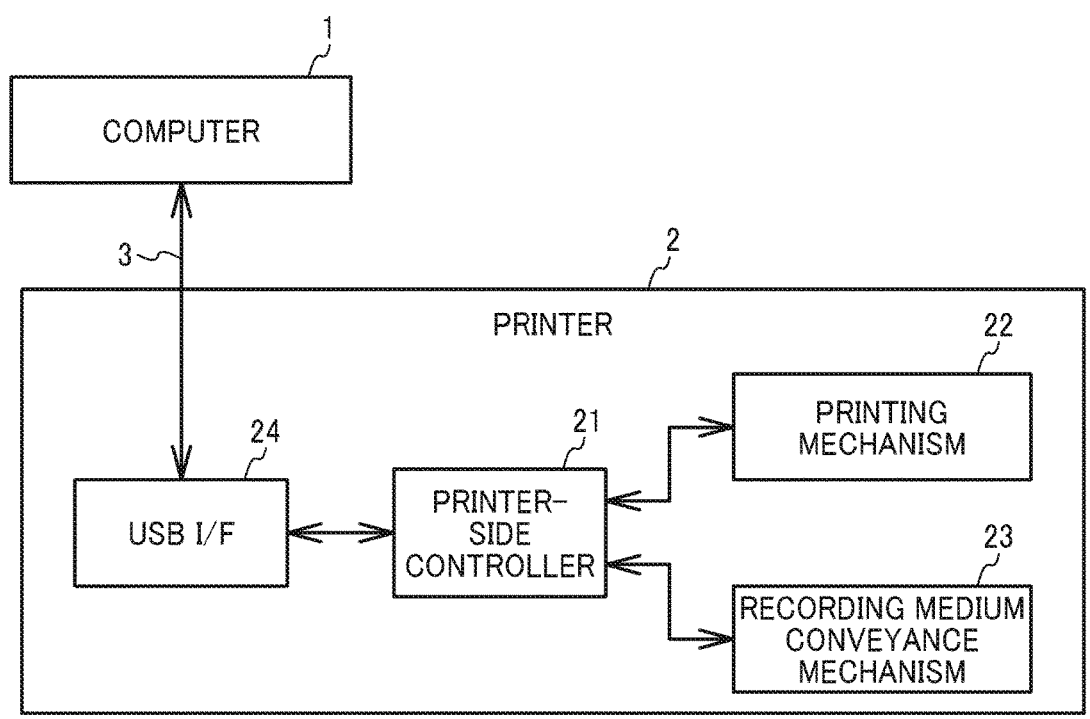
FIG. 3 is a block diagram illustrating a hardware configuration of a printer in the printing system of FIG. 1.

In describing embodiments illustrated in the drawings, specific terminology is employed for the sake of clarity. However, the disclosure of the present specification is not intended to be limited to the specific terminology so selected and it is to be understood that each specific element includes all technical equivalents that have a similar function, operate in a similar manner, and achieve a similar result.

Although the embodiments are described with technical limitations with reference to the attached drawings, such description is not intended to limit the scope of the disclosure and not all of the components or elements described in the embodiments of the present disclosure are indispensable to the present disclosure.

In a later-described comparative example, embodiment, and exemplary variation, for the sake of simplicity like reference numerals are given to identical or corresponding constituent elements such as parts and materials having the same functions, and redundant descriptions thereof are omitted unless otherwise required.

As used herein, the singular forms "a", "an", and "the" are intended to include the plural forms as well, unless the context clearly indicates otherwise.

Referring to the drawings, wherein like reference numerals designate identical or corresponding parts throughout the several views, embodiments of the present disclosure are described below.

<Configuration of Printing System>

Initially with reference to FIG. 1, a description is now given of an overall configuration of a printing system according to an embodiment of the present disclosure.

FIG. 1 is a schematic block diagram of a printing system 10 according to an embodiment of the present disclosure.

The printing system 10 illustrated in FIG. 1 serves as an information processing system or an image processing system. The printing system 10 includes a computer 1, a printer 2, and a channel 3, for example. The channel 3 connects the computer 1 and the printer 2 to each other, thereby allowing bidirectional communication between the computer 1 and the printer 2.

The computer 1 serves as an information processing apparatus while serving as a print controller that controls operation of the printer 2. The computer 1 performs bidirectional communication with the printer 2, which is connected to the computer 1 via the channel 3, to instruct the printer 2 to perform printing and to acquire apparatus information of the printer 2, for example.

The printer 2 serves as a printing apparatus (or an image processing apparatus) while serving as a controlled apparatus that is controlled by the computer 1. According to the present embodiment, the printer 2 is an inkjet printer that ejects ink droplets to print color images. The printer 2 includes a plurality of input trays serving as a media holder that holds recording media. For example, a plurality of printing sheets lies stacked on each of the plurality of input trays by size, type, quality, or the like.

The apparatus information of the printer 2 is status information indicating a status of the printer 2. The status information includes information on, e.g., options of the printer 2, the capacity of a memory of the printer 2, and the size of recording media for each input tray.

In the present embodiment, the channel 3 is a wired transmission line, such as a universal serial bus (USB) communication cable, through which information is transmitted. However, the channel 3 is not limited to a USB communication cable provided that the computer 1 recognizes the printer 2 as, e.g., a USB device and that the printer 2 recognizes the computer 1 as, e.g., a USB device. For example, wireless bidirectional communication may be performed between the computer 1 and the printer 2 with a wireless USB communication adapter connected to each of the computer 1 and the printer 2.

Referring now to FIG. 2, a description is given of a hardware configuration of the computer 1 in the printing system 10 described above.

FIG. 2 is a block diagram illustrating the hardware configuration of the computer 1 in the printing system 10.

As illustrated in FIG. 2, the computer 1 has substantially the same configuration as a configuration of general information processing terminals. Specifically, according to the present embodiment, the computer 1 includes, e.g., a central processing unit (CPU) 11, a read only memory (ROM) 12, a random access memory (RAM) 13, an external interface (I/F) 14, a universal serial bus interface (USB I/F) 15, an input controller 16, a display controller 17, and a memory 18 connected to each other via a bus B to send and receive information to and from each other via the bus B.

More specifically, the CPU 11 is an arithmetic device that controls overall operation of the computer 1. The ROM 12 is a non-volatile, read-only storage medium that stores a computer program (hereinafter referred to as a program) such as firmware. The RAM 13 is a volatile storage medium. Information is writable in and readable from the RAM 13 at high speed. The CPU 11 uses the RAM 13 as a working area to process information.

An optical drive 4 is communicably connected to the external I/F 14. The optical drive 4 reads information from an optical disk and writes information in the optical disk. The optical disk is a storage medium that stores information. Examples of the optical disk include a compact disc read only memory (CD-ROM) and a digital versatile disc (DVD). The printer 2 is connected to the USB I/F 15, allowing bidirectional communication therebetween. An input device 5 is connected to the input controller 16. The input device 5 is, e.g., a keyboard or a mouse. The input device 5 receives manual instruction and outputs an operation signal for the computer 1 according to the manual instruction. The input controller 16 receives, as an input signal, the operation signal outputted from the input device 5.

A display device 6 is connected to the display controller 17. The display device 6 is, e.g., a liquid crystal display that displays various types of images. With a visual user interface displayed on the display device 6, e.g., a user identifies a status of the computer 1 and the status of the printer 2. The display controller 17 outputs a display signal corresponding to an image to be displayed on the display device 6.

The memory 18 is a non-volatile storage medium that stores information. The memory 18 is a hard disk drive device, for example. Information is readable from the memory 18 and writable in the memory 18. The memory 18 stores various types of programs such as an operating system (OS), an application program (hereinafter referred to as an application), a printer driver, and a store device application. Such programs are recorded on an optical disk, for example, thereby being provided. Alternatively, such programs may be downloaded from a server via a network, thereby being distributed.

Note that the OS in the present embodiment is Microsoft Windows (registered trademark), for example. A description of functions implemented by the programs stored in the memory 18 is deferred.

Referring now to FIG. 3, a description is given of a hardware configuration of the printer 2 in the printing system 10.

FIG. 3 is a block diagram illustrating the hardware configuration of the printer 2 in the printing system 10.

As illustrated in FIG. 3, the printer 2 of the present embodiment includes, e.g., a printer-side controller 21, a printing device 22, a recording medium conveyance device 23, and a USB I/F 24. Specifically, the printer-side controller 21 controls overall operation of the printer 2. The printing device 22 prints an image on a recording medium. The recording medium conveyance device 23 conveys a recording medium along with printing operation performed by the printing device 22. On the one hand, the USB I/F 24 is connectable to the USB I/F 15 of the computer 1 via the channel 3 (e.g., a USB communication cable). On the other hand, the USB I/F 24 is connected to the printer-side controller 21, allowing bidirectional communication therebetween.

As described above, according to the present embodiment, the printer 2 is an ink jet printer. Therefore, the printing device 22 includes, e.g., an inkjet head having nozzle arrays for each ink color and a carriage moving device that moves a carriage in a main scanning direction. The carriage holds the inkjet head. The main scanning direction intersects or is perpendicular to a sub-scanning direction that is a direction in which a recording medium is conveyed.

The recording medium conveyance device 23 picks up recording media (e.g., printing sheets) one at a time from the input tray. After the carriage holding the inkjet head moves in the main scanning direction and before the carriage resumes movement in the main scanning direction, the recording medium conveyance device 23 conveys the recording medium a predetermined distance in the sub-scanning direction.

According to various types of information acquired from the computer 1 via the USB I/F 24, the printer-side controller 21 controls the printing device 22 and the recording medium conveyance device 23 such that an image is printed on the recording medium.

In response to a request for apparatus information of the printer 2 from the computer 1, the printer-side controller 21 transmits the apparatus information of the printer 2 as response data to the request. The apparatus information includes information on, e.g., options of the printer 2, the capacity of the memory of the printer 2, and the size of recording media for each input tray.

Figure 4:
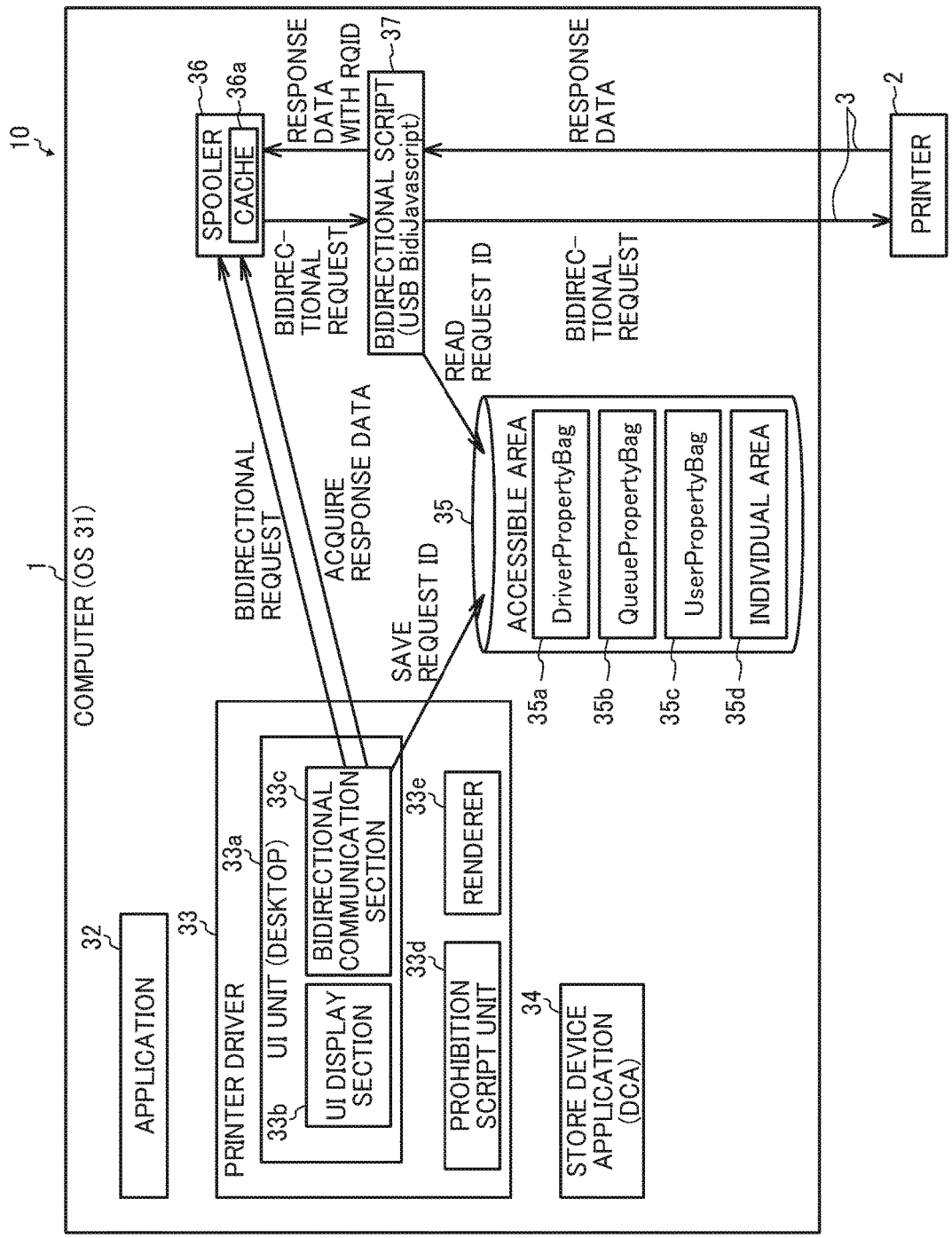
FIG. 4 is a functional block diagram of a computer according to a first embodiment of the present disclosure.

Referring now to FIG. 4, a description is given of functions of the computer 1 according to a first embodiment of the present disclosure.

FIG. 4 is a functional block diagram of the computer 1 according to the first embodiment of the present disclosure.

Specifically, the CPU 11 of the computer 1 reads various types of programs from the memory 18 and loads the programs into the RAM 13 to execute the programs, thereby implementing the functional block diagram of FIG. 4.

In the computer 1, an OS 31 operates. On the OS 31, an application 32, a printer driver 33, and a store device application 34 operate. The computer 1 is provided with an accessible area 35. In addition, a spooler 36 and a bidirectional script 37 operate in the computer 1. In the present embodiment, the bidirectional script 37 is USB Bidi Extender Javascript (registered trademark).

The application 32 is, e.g., document creation software or spreadsheet software. The application 32 prints work results on a recording medium with the printer 2. The printer driver 33 serves as driver software to control peripheral devices connected to the computer 1. That is, the printer driver 33 is a program for controlling the printer 2. The printer driver 33 is a version 4 printer driver (hereinafter referred to as a V4 printer driver), for example. When a device properties screen of the printer driver 33 is opened by, e.g., manual instruction, the printer driver 33 transmits a bidirectional request for acquisition of the apparatus information of the printer 2 to the spooler 36. Note that the bidirectional request may be hereinafter referred to as an acquisition request; a detailed description thereof is deferred. For each transmission of the bidirectional request, the printer driver 33 generates a request identifier (ID) for identifying the bidirectional request that is subjected to transmission. Then, the printer driver 33 stores the request ID in the accessible area 35. Thus, the request ID serves as identification information for identifying the acquisition request. The request ID also serves as identification information for identifying the apparatus information that is acquired from the printer 2 based on the bidirectional request. The printer driver 33 retrieves response data with a request ID (hereinafter referred to as response data with RQID) from the spooler 36 when a predetermined period of time elapses after the printer driver 33 transmits the bidirectional request. The response data with RQID herein serves as associated status information.

The store device application 34 is a program for displaying the status of the printer 2, managing a print job, and executing maintenance of the printer 2 in cooperation with the printer driver 33. The store device application 34 may be herein referred to as a device companion application (DCA). The accessible area 35 is a storage area in which information is storable. The accessible area 35 is accessible by the printer driver 33, the bidirectional script 37, and the like. A detailed description of the accessible area 35 is deferred.

The spooler 36 is a software module (hereinafter referred to as a module) that manages a printing function in the OS 31. The spooler 36 performs asynchronous bidirectional communication with the printer driver 33. In response to the bidirectional request from the printer driver 33, the spooler 36 calls the bidirectional script 37 to perform bidirectional communication with the printer 2. The spooler 36 is provided with a cache 36a serving as a cache memory that temporarily stores data such as the response data with RQID.

The bidirectional script 37 is a script program called from the spooler 36. The bidirectional script 37 performs synchronous bidirectional communication with the printer 2. For example, in response to the bidirectional request from the spooler 36, the bidirectional script 37 transmits the bidirectional request to the printer 2, and then acquires response data (i.e., apparatus information) from the printer 2. On the one hand, the bidirectional script 37 is capable of reading the request ID from the accessible area 35. On the other hand, the bidirectional script 37 is capable of adding a request ID to response data, thereby associating the response data and the request ID with each other, to generate response data with RQID. The bidirectional script 37 stores the response data with RQID thus generated in the cache 36a of the spooler 36.

With continued reference to FIG. 4, a detailed description is now given of the printer driver 33. The printer driver 33 includes a user interface (UI) unit 33a, a prohibition script unit 33d, and a renderer 33e.

The UI unit 33a includes a UI display section 33b and a bidirectional communication section 33c as modules. The UI display section 33b displays the UI screen on the display device 6 and receives manual instruction. In a case in which the manual instruction thus received requires bidirectional communication with the printer 2, the UI display section 33b notifies the bidirectional communication section 33c that the bidirectional communication with the printer 2 is required. For example, when a user operates the input device 5 to open the device properties screen of the printer driver 33, the UI display section 33b outputs a request for acquisition of apparatus information to the bidirectional communication section 33c.

In response to the request, the bidirectional communication section 33c transmits a bidirectional request (i.e., acquisition request) to perform bidirectional communication with the printer 2, and acquires the apparatus information (i.e., response data) from the printer 2. Specifically, for example, when the device properties screen of the printer driver 33 is opened, the bidirectional communication section 33c transmits the bidirectional request to the spooler 36. When the predetermined period of time elapses from the transmission of the bidirectional request, the bidirectional communication section 33c retrieves response data with RQID from the cache 36a of the spooler 36. The bidirectional communication section 33c acquires the apparatus information from the response data with RQID. The UI display section 33b displays the apparatus information on the UI screen.

The prohibition script unit 33d is a script program for controlling various types of prohibition settings in a printing process. The renderer 33e is a module that receives data of an image that is subjected to printing and performs a rendering process according to print settings. The renderer 33e generates a print command interpretable by the printer 2.

With continued reference to FIG. 4, a detailed description is now given of the accessible area 35.

According to the present embodiment, the printer driver 33 is a V4 printer driver. Therefore, the accessible area 35 of the present embodiment includes a plurality of storage areas, namely, a DriverPropertyBag 35a, a QueuePropertyBag 35b, a UserPropertyBag 35c, and an individual area 35d. Although the accessible area 35 includes the plurality of storage areas as described above, the access authority is different between modules.

The DriverPropertyBag 35a is a storage area from which the printer driver 33 is capable of reading information. The DriverPropertyBag 35a is allocated per driver. A configuration file of the printer driver 33 is storable in the DriverPropertyBag 35a. The configuration file is determined before being stored in the DriverPropertyBag 35a.

The printer driver 33 is capable of reading information from the QueuePropertyBag 35b and writing information in the QueuePropertyBag 35b. The writing depends on authority. The QueuePropertyBag 35b is allocated per printer icon (i.e., logical printer). Per-printer-icon information is storable in the QueuePropertyBag 35b. The information stored in the QueuePropertyBag 35b is accessible from another module such as the bidirectional script 37.

The printer driver 33 is capable of reading information from the UserPropertyBag 35c and writing information in the UserPropertyBag 35c. The UserPropertyBag 35c is allocated per printer icon and per user. Therefore, information of a plurality of users is storable in the UserPropertyBag 35c for each printer icon. The printer driver 33 is incapable of accessing information of another user.

The individual area 35d is a storage area in which information is storable in a format individually determined.

<Comparative Example of Asynchronous Bidirectional Communication>

Figure 5:
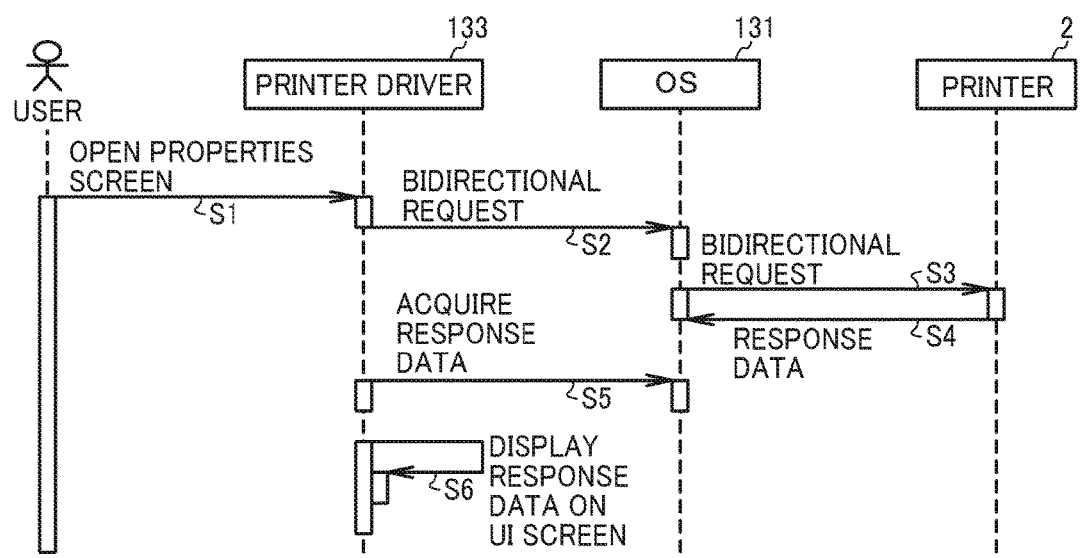
FIG. 5 is a sequence diagram illustrating a comparative example of asynchronous bidirectional communication.
Figure 6:
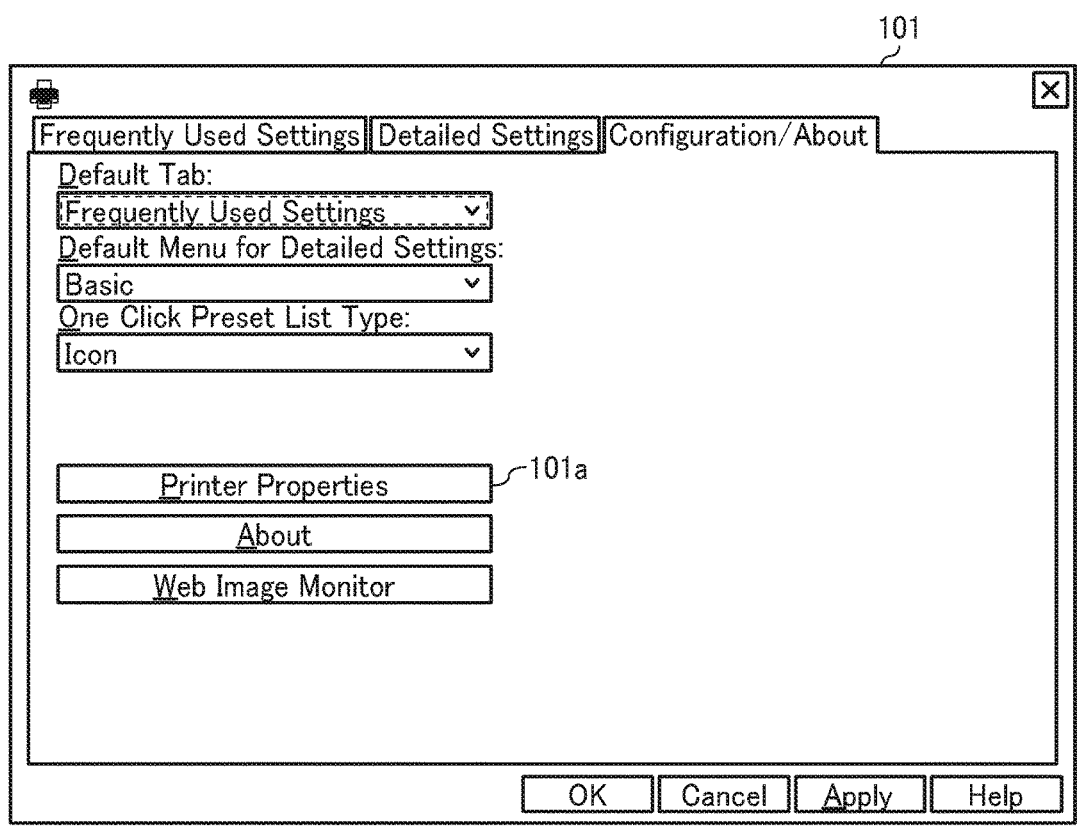
FIG. 6 is a diagram illustrating a display example of a user interface with which bidirectional communication is executable.
Figure 7:
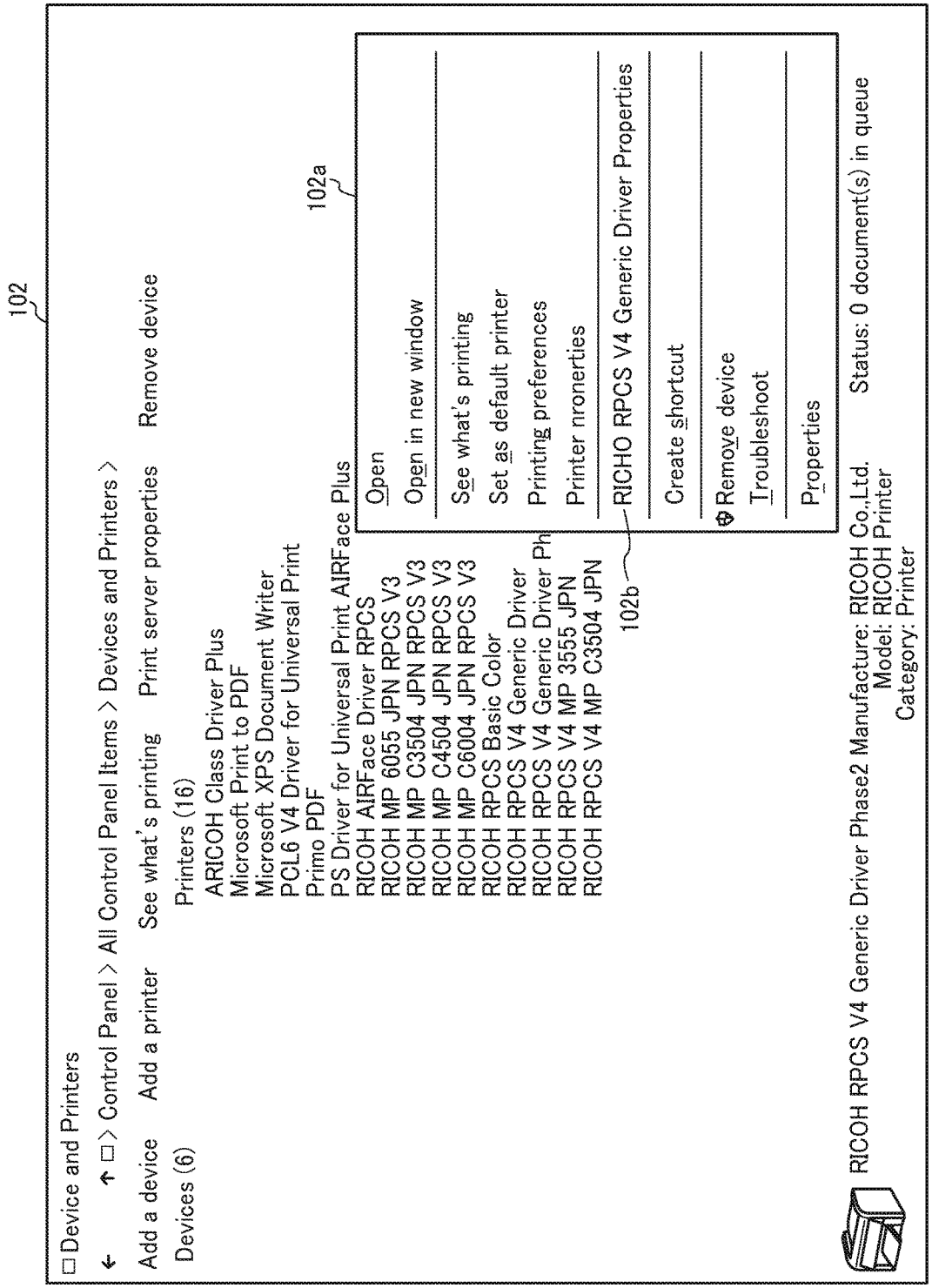
FIG. 7 is a diagram illustrating another display example of the user interface with which bidirectional communication is executable.

Referring now to FIGS. 5 through 7, a description is given of a comparative example of asynchronous bidirectional communication performed by a typical V4 printer driver, with respect to the asynchronous bidirectional communication performed by the printer driver 33.

FIG. 5 is a sequence diagram illustrating the comparative example of asynchronous bidirectional communication. FIG. 6 is a diagram illustrating a display example of a user interface with which bidirectional communication is executable. FIG. 7 is a diagram illustrating another display example of the user interface with which bidirectional communication is executable.

As illustrated in FIG. 5, in the comparative example, when, e.g., a user opens a device properties screen of a printer driver 133 as a V4 printer driver in step S1, the printer driver 133 transmits a bidirectional request for acquisition of apparatus information of the printer 2 to an OS 131 in step S2.

Here, a description is given of operation of opening the device properties screen of the V4 printer driver (e.g., printer driver 33 or printer driver 133).

One example of the operation of opening the device properties screen includes operation of the input device 5 to select and press a "Printer Properties" button 101a from a driver print setting screen 101, illustrated in FIG. 6, displayed on the display device 6, thereby opening the printer properties screen. The UI display section 33b displays the driver print setting screen 101 on the display device 6 when a user opens a print setting screen of the V4 printer driver to change print settings at the time of printing, for example.

Another example of the operation of opening the device properties screen includes selecting and pressing a "V4 Generic Driver Properties" button 102b from a menu screen 102a of a setting target printer opened from a printer icon list screen 102 illustrated in FIG. 7, thereby opening a driver properties screen. The UI display section 33b displays the menu screen 102a on the display device 6 to change default print settings of the printer 2, for example.

Referring back to FIG. 5, asynchronous communication is performed between the printer driver 133 and the OS 131. Therefore, after transmitting the bidirectional request to the OS 131, the printer driver 133 is released before receiving response data to the bidirectional request from the OS 131.

In response to the bidirectional request from the printer driver 133, the OS 131 transmits the bidirectional request to the printer 2 in step S3. Synchronous communication is performed between the OS 131 and the printer 2. Therefore, the OS 131 waits for response data from the printer 2 after transmitting the bidirectional request. In response to the bidirectional request from the OS 131, the printer 2 transmits apparatus information to the OS 131 as response data to the bidirectional request in step S4. The OS 131 stores the response data (i.e., apparatus information) thus received from the printer 2.

In step S5, the printer driver 133 acquires the response data from the OS 131 on condition that a predetermined period of time elapses after the printer driver 133 transmits the bidirectional request to the OS 131. The printer driver 133 displays the response data (i.e., apparatus information) thus acquired on the UI screen in step S6.

In the comparative example described above, if the printer driver 133 tries to acquire response data from the OS 131 before the OS 131 receives response data from the printer 2, the printer driver 133 may fail to acquire the response data or may acquire old response data temporarily stored in the OS 131.

To address such a situation, in the present embodiment, a bidirectional request is identified with the corresponding request ID (i.e., identification information). Based on the request ID, the bidirectional communication section 33c determines whether to acquire the apparatus information of the printer 2.

As illustrated in FIG. 4, for each transmission of the bidirectional request, the bidirectional communication section 33c of the printer driver 33 writes a request ID in the QueuePropertyBag 35b of the accessible area 35. In response to the response data from the printer 2, the bidirectional script 37 called by the spooler 36 reads the request ID from the accessible area 35 and adds the request ID thus read to the response data, thereby generating response data with RQID. Then, the bidirectional script 37 stores the response data with RQID in the cache 36a of the spooler 36. The bidirectional communication section 33c requests and acquires the response data with RQID from the cache 36a of the spooler 36. The bidirectional communication section 33c compares the request ID written in the accessible area 35 with the request ID of the response data with RQID retrieved from the cache 36a. In a case in which the two request IDs are the same, the bidirectional communication section 33c determines that the response data (i.e., apparatus information) to the bidirectional request is acquired. Then, the bidirectional communication section 33c acquires the response data from the response data with RQID. By contrast, in a case in which the two request IDs are different from each other, the bidirectional communication section 33c determines that the response data to the bidirectional request is not acquired. Therefore, the bidirectional communication section 33c does not acquire the response data from the response data with RQID.

<Sequence for Acquiring Apparatus Information According to First Embodiment>

Referring now to FIGS. 8 through 11, a detailed description is given of a sequence for acquiring the apparatus information of the printer 2 according to the first embodiment of the present disclosure.

Figure 8:
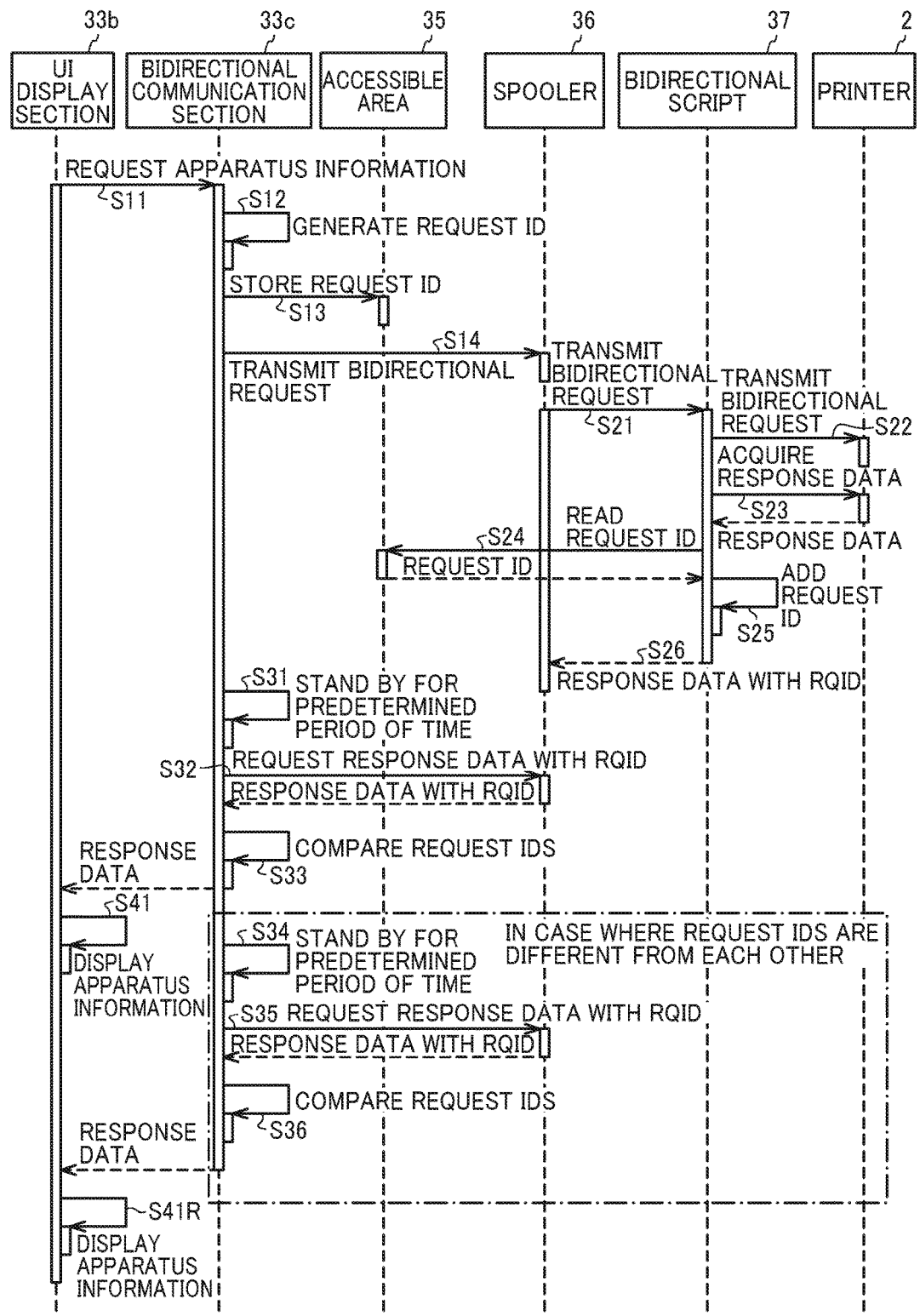
FIG. 8 is a sequence diagram illustrating acquisition of apparatus information according to the first embodiment of the present disclosure.
Figure 11:
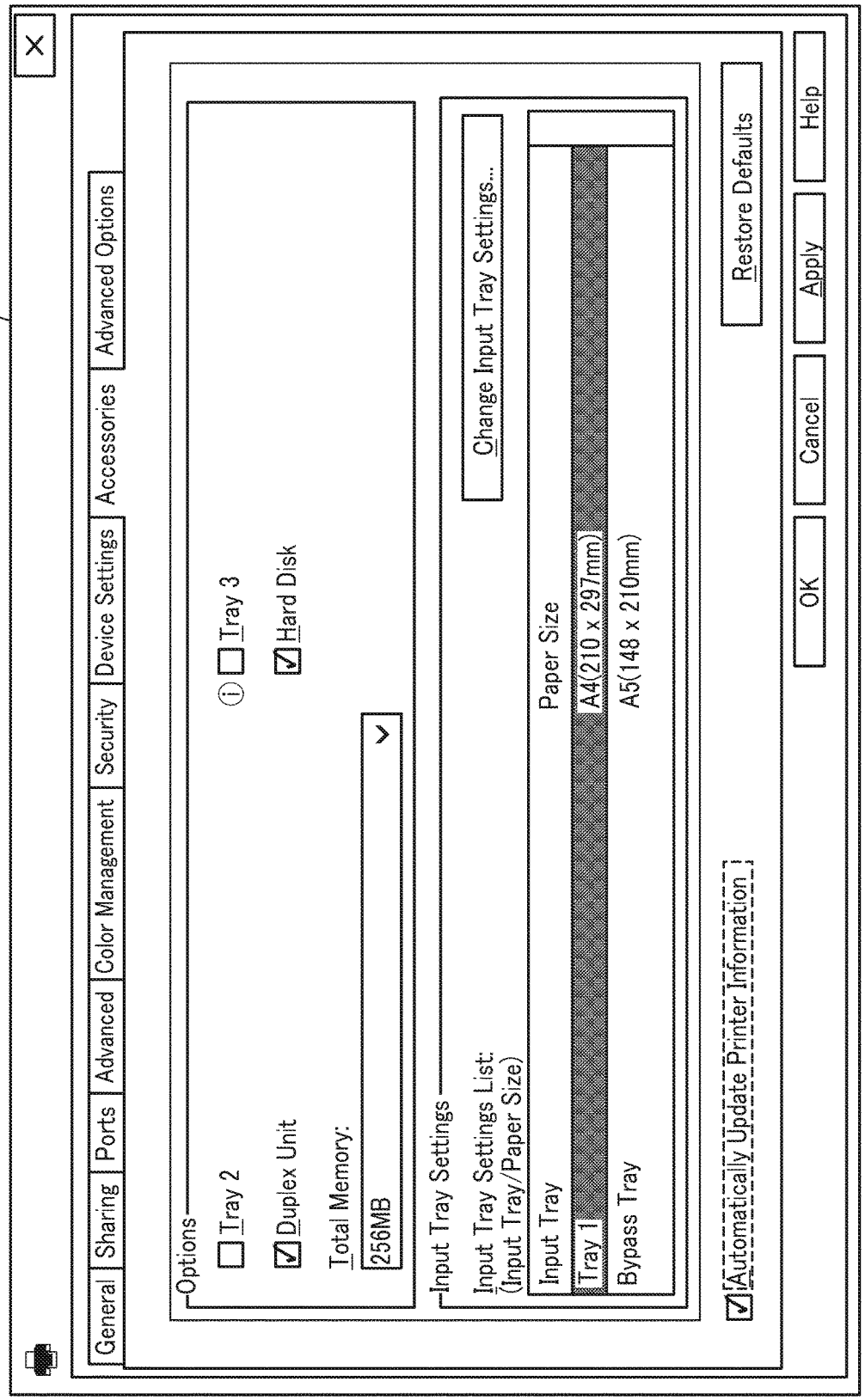
FIG. 11 is a diagram illustrating a display example of the apparatus information acquired.

FIG. 8 is a sequence diagram illustrating acquisition of the apparatus information according to the first embodiment of the present disclosure. FIG. 9 is a diagram illustrating an example of the request ID. FIG. 10 is a diagram illustrating an example of the apparatus information (i.e., response data). FIG. 11 is a diagram illustrating a display example of the apparatus information acquired.

As described above, the UI display section 33b and the bidirectional communication section 33c are modules included in the printer driver 33. The accessible area 35 is a storage area accessible by, e.g., the bidirectional communication section 33c and the bidirectional script 37. For example, the bidirectional communication section 33c writes information in the accessible area 35. On the other hand, the bidirectional script 37 reads the information from the accessible area 35. The spooler 36 is a module of the OS 31. The bidirectional script 37 is a script called by the spooler 36.

As illustrated in FIG. 8, when, e.g., a user operates the input device 5 to open the device properties screen of the printer driver 33, the UI display section 33b outputs a request for acquisition of the apparatus information to the bidirectional communication section 33c in step S11. Examples of the operation of opening the device properties screen include pressing the "Printer Properties" button 101a described above with reference to FIG. 6 and pressing the "V4 Generic Driver Properties" button 102b described above with reference to FIG. 7.

In response to the request, the bidirectional communication section 33c generates a request ID in step S12. The request ID corresponds to identification information for uniquely identifying a bidirectional request or the apparatus information transmitted from the printer 2. The bidirectional communication section 33c generates a request ID each time the UI display section 33b outputs a request for acquisition of apparatus information. The request ID is a random value generated by the bidirectional communication section 33c. Examples of the request ID include, but are not limited to, a random number generated by a pseudorandom number generation algorithm or a pseudorandom number generator, and a random value generated based on, e.g., the information on the date and time when the bidirectional communication section 33c receives a bidirectional request (i.e., acquisition request). FIG. 9 illustrates "98573409857", which is a random numerical value of 11 digits, as an example of the request ID generated. The request ID is not limited to a numerical value provided that the request ID is a unique value. For example, the request ID may include text and/or symbols. In a case in which the request ID includes a numerical value, the numerical value is not limited to a random numerical value. For example, the numerical value may be a count-up value that is incremented by one (i.e., +1) each time the bidirectional communication section 33c receives a bidirectional request. Thus, the bidirectional communication section 33c generates a request ID each time the UI display section 33b outputs a request for acquisition of apparatus information. Note that the bidirectional communication section 33c does not generate continuous request IDs of the same value.

Referring back to FIG. 8, the bidirectional communication section 33c stores the request ID thus generated in the accessible area 35, more specifically, the QueuePropertyBag 35b, in step S13. Since the bidirectional communication section 33c is incapable of directly transmitting the request ID to the spooler 36 or the bidirectional script 37, the bidirectional communication section 33c stores the request ID in the accessible area 35. When storing the request ID in the accessible area 35, the bidirectional communication section 33c designates a key and value pair as illustrated in FIG. 9. The designation of the key and value pair corresponds to a write command. Accordingly, the value of the request ID is stored in an area designated by the key in the accessible area 35. Since the key is fixed, the value of the request ID is overwritten each time the request ID is stored in the accessible area 35. As a consequence, the latest request ID is stored in the accessible area 35.

After storing the request ID, the bidirectional communication section 33c transmits a bidirectional request to the spooler 36 in step S14. Processing of the spooler 36 is asynchronous with processing of the bidirectional communication section 33c. Therefore, the bidirectional communication section 33c is released after transmitting the bidirectional request and before receiving the response data (i.e., apparatus information) to the bidirectional request.

Note that, in the present embodiment, the bidirectional communication section 33c transmits the bidirectional request after storing the request ID. Alternatively, however, the bidirectional communication section 33c may store the request ID after transmitting the bidirectional request provided that the bidirectional communication section 33c stores the request ID and transmits the bidirectional request at substantially the same time.

In response to the bidirectional request from the bidirectional communication section 33c, the spooler 36 transmits the bidirectional request thus received to the bidirectional script 37 in step S21. In response to the bidirectional request from the spooler 36, the bidirectional script 37 transmits the bidirectional request to the printer 2 in step S22. Synchronous communication is performed between the bidirectional script 37 and the printer 2. Therefore, after transmitting the bidirectional request to the printer 2, the bidirectional script 37 acquires response data from the printer 2 in step S23. In other words, after receiving the bidirectional request, the printer 2 transmits the apparatus information as response data to the request for acquisition of apparatus information from the bidirectional script 37 in step S23.

For example, the printer 2 transmits the apparatus information illustrated in FIG. 10 as response data. FIG. 10 illustrates options (i.e., Option) and input trays (i.e., InputTray) of the printer 2. Specifically, the options include a duplex printing unit (i.e., DuplexUnit), a hard disk drive device (i.e., HardDisk), and memory capacity (i.e., Memory). The input trays include a first input tray (i.e., Tray) and a bypass tray (i.e., Bypass). The present example of FIG. 10 illustrates that the duplex printing unit and the hard disk drive are installed as options of the printer 2, and that the capacity of a memory installed in the printer 2 is 256 megabyte (MB). In addition, the present example of FIG. 10 illustrates that the first input tray is set for A4 size sheets and that the bypass tray is set for A5 size sheets.

Referring back to FIG. 8, in response to the response data (i.e., apparatus information) from the printer 2, the bidirectional script 37 reads the request ID from the accessible area 35, more specifically, the QueuePropertyBag 35b, in step S24. As described above, since the bidirectional script 37 is incapable of directly receiving the request ID from the bidirectional communication section 33c, the bidirectional script 37 reads the request ID from the accessible area 35. When reading the request ID from the accessible area 35, the bidirectional script 37 designates the key alone (e.g., "BidiRequestID" in FIG. 9). Note that the designation of the key alone corresponds to a read command. Thus, the bidirectional script 37 reads the value of the request ID stored in the area designated by the key.

In step S25, the bidirectional script 37 adds the value of the request ID thus read from the accessible area 35 to the response data received from the printer 2, thereby associating the response data and the value of the request ID with each other. Thus, the bidirectional script 37 generates response data with RQID. In step S26, the bidirectional script 37 transmits the response data with RQID to the spooler 36. The spooler 36 receives and stores the response data with RQID in the cache 36a.

After transmitting the bidirectional request to the spooler 36, the bidirectional communication section 33c stands by for a predetermined period of time in step S31. The predetermined period of time as a standby time is a normal period of time taken until the spooler 36 stores the response data with RQID.

After standing by for the predetermined period of time, the bidirectional communication section 33c requests and acquires response data with RQID from the spooler 36 in step S32. The response data with RQID retrieved from the spooler 36 is the response data with RQID stored in the cache 36a of the spooler 36 at the time when the bidirectional communication section 33c requests the response data with RQID in step S32.

That is, in a case in which the processing of steps S21 through S26 is completed by the time when the bidirectional communication section 33c requests the response data with RQID in step S32, the response data with RQID retrieved from the spooler 36 is the latest response data with RQID reflecting the latest apparatus information. By contrast, in a case in which the processing of steps S21 through S26 is not completed by the time when the bidirectional communication section 33c requests the response data with RQID in step S32, the response data with RQID retrieved from the spooler 36 is old response data with RQID failing to reflect the latest apparatus information.

In step S33, the bidirectional communication section 33c compares the request ID stored in the accessible area 35 with the request ID included in the response data with RQID. In a case in which the two request IDs include identical values, that is, in a case in which the request IDs are the same, the bidirectional communication section 33c determines that the response data with RQID retrieved from the spooler 36 is data responding to the bidirectional request transmitted in step S14. In such a case, the bidirectional communication section 33c acquires the response data from the response data with RQID retrieved from the cache 36a. By contrast, in a case in which the two request IDs include different values, that is, in a case in which the request IDs are different from each other, the bidirectional communication section 33c determines that the response data with RQID retrieved from the spooler 36 is old data. In other words, the bidirectional communication section 33c determines that the spooler 36 has yet to acquire the latest apparatus information from the printer 2. In such a case, the bidirectional communication section 33c does not acquire the response data from the response data with RQID retrieved from the cache 36a.

Accordingly, when the two request IDs include identical values, that is, when the request IDs are the same, the bidirectional communication section 33c acquires the response data (i.e., apparatus information) from the response data with RQID, and displays the apparatus information thus acquired with the UI display section 33b in step S41. For example, the UI display section 33b displays a display screen 103 illustrated in FIG. 11 with the display device 6. The display screen 103 of FIG. 11 indicates that the duplex printing unit (i.e., Duplex Unit) and the hard disk drive device (i.e., Hard Disk) are installed as options and that the capacity of the installed memory (i.e., Total Memory) is 256 MB. In addition, the display screen 103 of FIG. 11 indicates that the first input tray (i.e., Tray 1) is set for A4 size sheets (e.g., A4 size paper) and that the bypass tray (i.e., Bypass Tray) is set for A5 size sheets (e.g., A5 size paper).

Referring back to FIG. 8, when the two request IDs include different values, that is, when the request IDs are different from each other, the bidirectional communication section 33c does not acquire the response data from the response data with RQID. Instead, the bidirectional communication section 33c stands by for another predetermined period of time in step S34. In step S35, the bidirectional communication section 33c requests and retrieves response data with RQID from the spooler 36. Accordingly, the bidirectional communication section 33c acquires the response data with RQID. In step S36, the bidirectional communication section 33c compares the request ID stored in the accessible area 35 with the request ID included in the response data with RQID. When the two request IDs include identical values, that is, when the request IDs are the same, the bidirectional communication section 33c acquires the response data (i.e., apparatus information) from the response data with RQID, and displays the apparatus information thus acquired with the UI display section 33b in step S41R. By contrast, when the two request IDs include different values, that is, when the request IDs are different from each other, the bidirectional communication section 33c does not acquire the response data from the response data with RQID. Instead, the bidirectional communication section 33c repeats the processing of steps S34 through S36 until the request IDs include identical values.

As described above, in the printing system 10 of the first embodiment, the bidirectional communication section 33c of the printer driver 33 writes a request ID in the accessible area 35 upon transmission of the bidirectional request. The bidirectional script 37 reads the request ID written in the accessible area 35, generates response data with RQID, and stores the response data with RQID in the cache 36a of the spooler 36.

Based on the request ID included in the response data with RQID, the bidirectional communication section 33c determines whether or not to acquire the response data (i.e., apparatus information) from the response data with RQID retrieved from the cache 36a. Specifically, the bidirectional communication section 33c compares the request ID generated with the request ID included in the response data with RQID. When the two request IDs include identical values, the bidirectional communication section 33c determines that the response data with RQID responds to the latest bidirectional request, and acquires response data from the response data with RQID.

As a consequence, a response to a bidirectional request is acquired as in synchronous communication. Therefore, even when asynchronous bidirectional communication is performed between the printer 2 and the computer 1, the computer 1 acquires desired apparatus information from the printer 2.

Second Embodiment

In the printing system 10 of the first embodiment described above, the bidirectional communication section 33c generates a request ID in response to the operation of opening the device properties screen. Alternatively, for example, the bidirectional script 37 may generate a response ID as identification information for identifying apparatus information in response to response data (i.e., apparatus information) from the printer 2.

Figure 12:
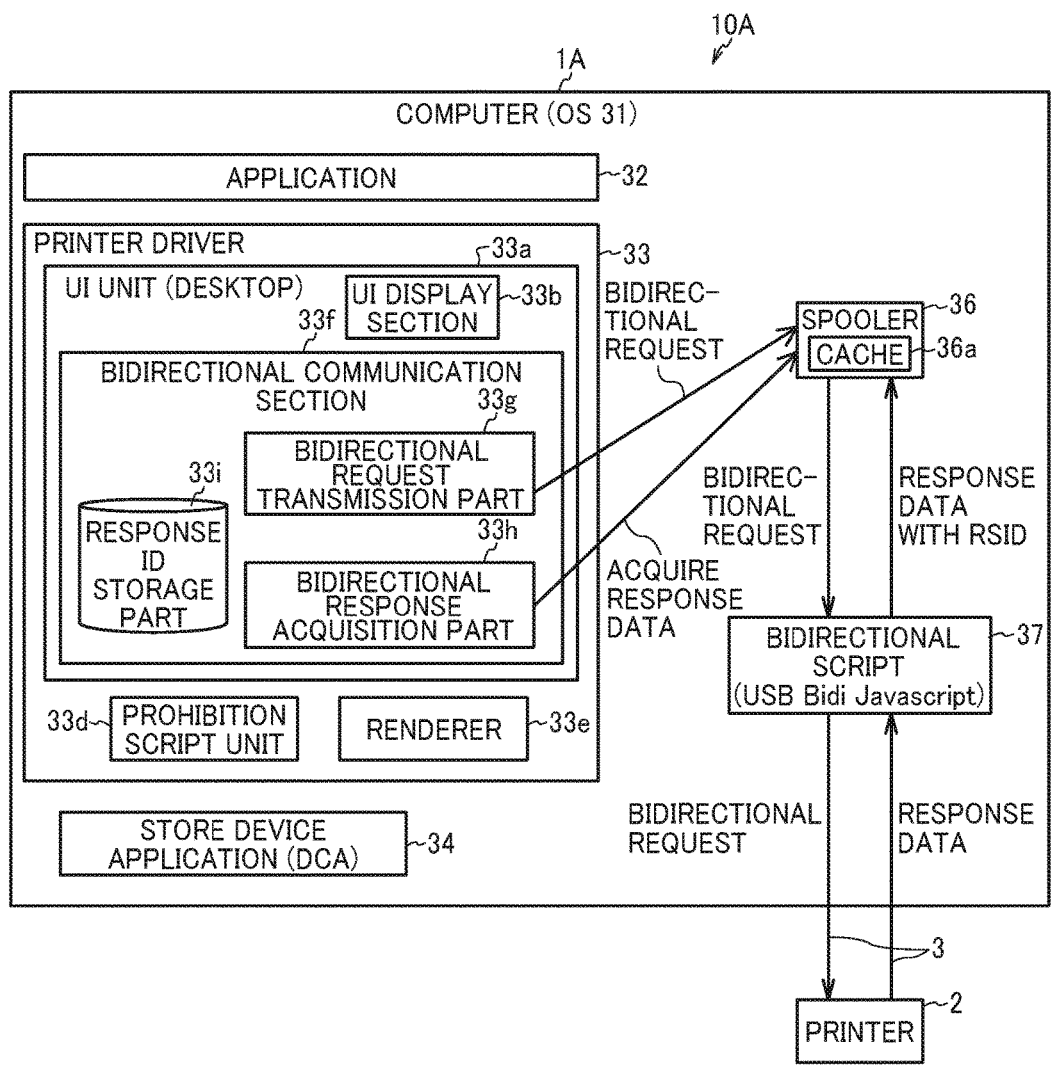
FIG. 12 is a functional block diagram of a computer according to a second embodiment of the present disclosure.

Referring now to FIG. 12, a description is given of such a printing system using the response ID according to a second embodiment.

Note that the components identical or similar to the components of the first embodiment will be denoted by identical or similar reference numerals, and a description thereof will be omitted as appropriate. The following description will concentrate on the differences between the first embodiment and the second embodiment.

FIG. 12 is a functional block diagram of a computer 1A according to the second embodiment of the present disclosure.

As illustrated in FIG. 12, a printing system 10A of the second embodiment includes the computer 1A and a printer 2. A channel 3 connects the computer 1A and the printer 2 to each other, thereby allowing bidirectional communication between the computer 1A and the printer 2. The printing system 10A of the second embodiment is different from the printing system 10 of the first embodiment in that the printing system 10A excludes the accessible area 35 while including a bidirectional communication section 33f having a configuration different from the configuration of the bidirectional communication section 33c of the printing system 10 according to the first embodiment.

Specifically, similarly to the computer 1 of the first embodiment, a CPU 11 of the computer 1A reads various types of programs from a memory 18 and loads the programs into a RAM 13 to execute the programs, thereby implementing each functional block of the computer 1A of the second embodiment illustrated in FIG. 12.

In the computer 1A, an OS 31 operates. On the OS 31, an application 32, a printer driver 33, a store device application 34, a spooler 36, and a bidirectional script 37 operate.

The printer driver 33 is a V4 printer driver, for example. The printer driver includes a UI unit 33a, a prohibition script unit 33d, and a renderer 33e. In the present embodiment, the UI unit 33a includes a UI display section 33b and the bidirectional communication section 33f as modules.

The bidirectional communication section 33f includes a bidirectional request transmission part 33g, a bidirectional response acquisition part 33h, and a response ID storage part 33i. The bidirectional request transmission part 33g transmits a bidirectional request, which is a request for acquisition of apparatus information, to the spooler 36. The bidirectional response acquisition part 33h acquires response data with a response ID (hereinafter referred to as response data with RSID) from the spooler 36. The response ID storage part 33i stores a response ID and the like. A detailed description of the response data with RSID is deferred.

In the second embodiment, each time the bidirectional script 37 receives response data from the printer 2, the bidirectional script 37 generates a response ID and adds the response ID to the response data, thereby generating response data with RSID. A detailed description thereof is deferred. The bidirectional script 37 stores the response data with RSID thus generated in a cache 36a of the spooler 36.

In response to a request for acquisition of apparatus information from the UI display section 33b, the bidirectional request transmission part 33g transmits a bidirectional request to the spooler 36. As soon as the spooler 36 receives the bidirectional request, the spooler 36 returns data stored in the cache 36a as cache data. For example, in a case in which response data with RSID is stored in the cache 36a when the spooler 36 receives the bidirectional request, the spooler 36 returns the response data with RSID as cache data. By contrast, in a case in which response data with RSID is not stored in the cache 36a, that is, in a case in which the spooler 36 receives the bidirectional request before initial bidirectional communication with the printer 2, the spooler 36 returns empty data (e.g., null data) as cache data.

In a case in which the spooler 36 returns the response data with RSID, the bidirectional response acquisition part 33h stores in the response ID storage part 33i the response ID included in the response data with RSID. By contrast, in a case in which the spooler 36 returns empty data, the bidirectional response acquisition part 33h stores the empty data in the response ID storage part 33i.

After receiving the cache data, the bidirectional response acquisition part 33h stands by for a predetermined period of time. Then, the bidirectional response acquisition part 33h retrieves response data with RSID from the spooler 36, and compares the response ID included in the response data with RSID with the response ID stored in the response ID storage part 33i.

In a case in which the two response IDs are inconsistent with each other, the bidirectional response acquisition part 33h determines that the response data is updated. Then, the bidirectional response acquisition part 33h acquires response data from the response data with RSID. Note that, in a case in which the bidirectional response acquisition part 33h receives response data with RSID while empty data is stored in the response ID storage part 33i, the bidirectional response acquisition part 33h determines that the response data is updated.

By contrast, in a case in which the response ID included in the response data with RSID matches the response ID stored in the response ID storage part 33i, the bidirectional response acquisition part 33h determines that the response data is not updated. In such a case, the bidirectional response acquisition part 33h does not acquire the response data from the response data with RSID.

In the second embodiment, similarly to the first embodiment, a response to a bidirectional request is acquired as in synchronous communication. Therefore, even when asynchronous bidirectional communication is performed between the printer 2 and the computer 1A, the computer 1A acquires desired apparatus information from the printer 2.

In addition, in the second embodiment, bidirectional communication is allowed for, e.g., a user not authorized to access the QueuePropertyBag 35b described above in the first embodiment.

<Sequence for Acquiring Apparatus Information According to Second Embodiment>

Figure 13:
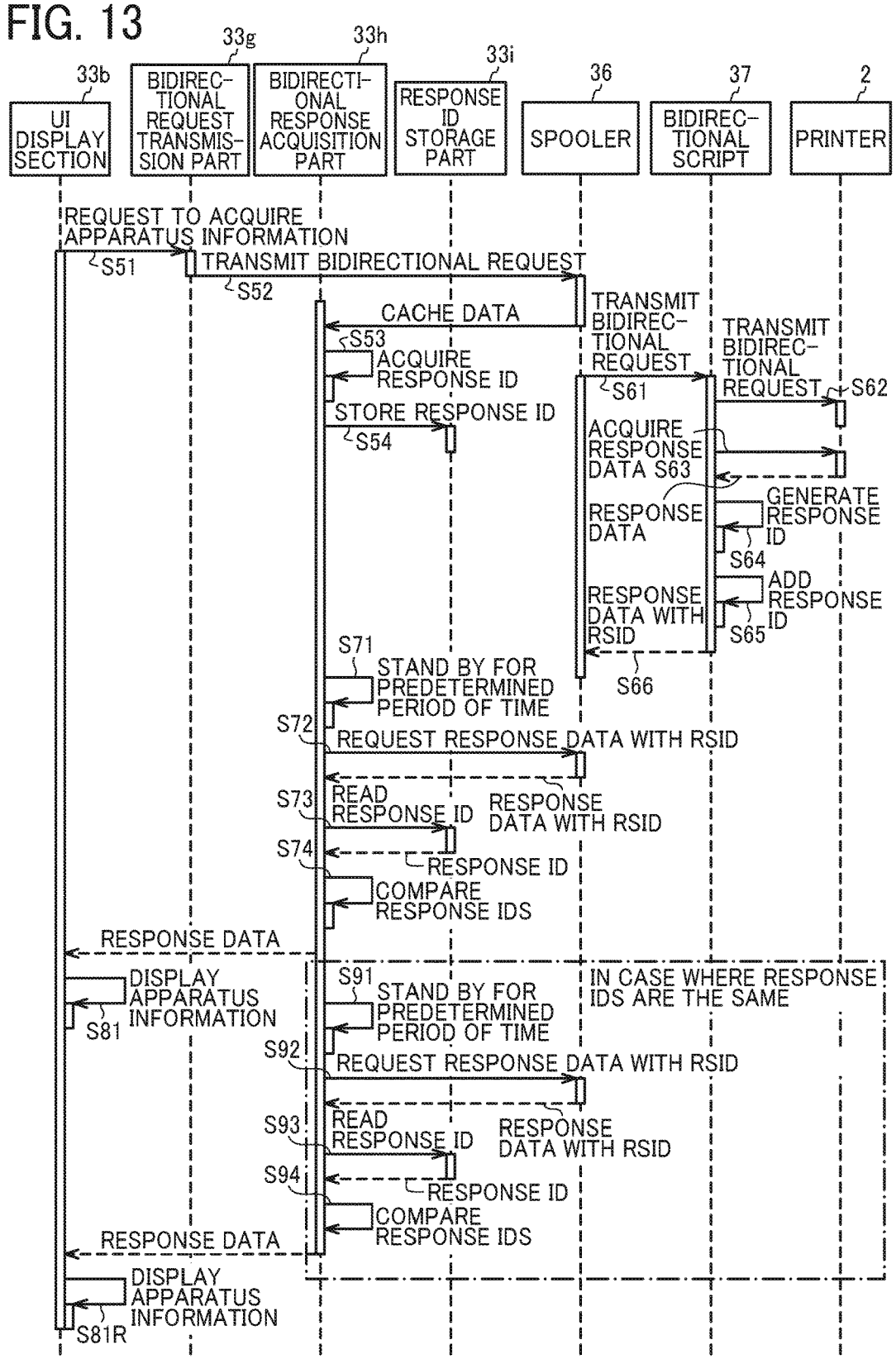
FIG. 13 is a sequence diagram illustrating acquisition of the apparatus information according to the second embodiment of the present disclosure.

Referring now to FIG. 13, a detailed description is given of a sequence for acquiring apparatus information of the printer 2 according to the second embodiment of the present disclosure.

FIG. 13 is a sequence diagram illustrating acquisition of the apparatus information according to the second embodiment of the present disclosure.

As described above, the UI display section 33b, the bidirectional request transmission part 33g, and the bidirectional response acquisition part 33h are modules included in the printer driver 33. The response ID storage part 33i is set as a storage area of the bidirectional communication section 33f. The spooler 36 is a module of the OS 31. The bidirectional script 37 is a script called by the spooler 36.

As illustrated in FIG. 13, when, e.g., a user operates the input device 5 to open a device properties screen of the printer driver 33, the UI display section 33b outputs a request for acquisition of apparatus information to the bidirectional communication section 33f in step S51. Examples of the operation of opening the device properties screen include pressing the "Printer Properties" button 101a described above with reference to FIG. 6 and pressing the "V4 Generic Driver Properties" button 102b described above with reference to FIG. 7.

In response to the request, the bidirectional request transmission part 33g transmits a bidirectional request to the spooler 36 in step S52. In response to the bidirectional request, the spooler 36 returns cache data (e.g., response data with RSID stored in the cache 36a). In a case in which the cache data is response data with RSID, the bidirectional response acquisition part 33h acquires a response ID from the response data with RSID in step S53. In step S54, the bidirectional response acquisition part 33h stores the response ID in the response ID storage part 33i. Note that, in a case in which the cache data is empty data, the bidirectional response acquisition part 33h acquires empty data based on the cache data, and stores the empty data in the response ID storage part 33i. (Such a process may be followed in steps S72 and S92 described later.)

In response to the bidirectional request from the bidirectional request transmission part 33g, the spooler 36 transmits the bidirectional request thus received to the bidirectional script 37 in step S61. In response to the bidirectional request from the spooler 36, the bidirectional script 37 transmits the bidirectional request to the printer 2 in step S62. Synchronous communication is performed between the bidirectional script 37 and the printer 2. Therefore, after transmitting the bidirectional request to the printer 2, the bidirectional script 37 acquires response data from the printer 2 in step S63. In other words, after receiving the bidirectional request, the printer 2 transmits the apparatus information as response data to the request for acquisition of apparatus information from the bidirectional script 37 in step S63.

Upon acquiring the response data from the printer 2, the bidirectional script 37 generates a response ID in step S64. The response ID corresponds to identification information for uniquely identifying the response data (i.e., apparatus information) acquired from the printer 2. The response ID is a random value generated by the bidirectional script 37. Examples of the response ID include, but are not limited to, a random number generated by a pseudorandom number generation algorithm or a pseudorandom number generator, and a random value generated based on, e.g., the information on the date and time when the bidirectional script 37 receives response data. The response ID is not limited to a numerical value provided that the response ID is a unique value. For example, the response ID may include text and/or symbols. In a case in which the response ID includes a numerical value, the numerical value is not limited to a random numerical value. For example, the numerical value may be a count-up value that is incremented by one (i.e., +1) each time the bidirectional script 37 receives response data. The bidirectional script 37 generates a response ID each time the bidirectional script 37 receives response data. Note that the bidirectional script 37 does not generate continuous response IDs of the same value.

In step S65, the bidirectional script 37 adds the response ID thus generated to the response data, thereby associating the response data and the response ID with each other. Thus, the bidirectional script 37 generates response data with RSID. In step S66, the bidirectional script 37 stores the response data with RSID in the cache 36a of the spooler 36.

After storing the response ID in the response ID storage part 33i in step S54, the bidirectional response acquisition part 33h stands by for a predetermined period of time in step S71. The predetermined period of time as a standby time is a normal period of time taken until new response data with RSID is stored in the cache 36a of the spooler 36.

After standing by for the predetermined period of time, the bidirectional response acquisition part 33h requests response data with RSID from the spooler 36 in step S72. In response to the request, the spooler 36 transmits the response data with RSID.

In a case in which the processing of steps S61 through S66 is completed by the time when the bidirectional response acquisition part 33h requests response data with RSID in step S72, the latest response data with RSID is stored in the cache 36a of the spooler 36. That is, the spooler 36 transmits the latest response data with RSID to the bidirectional response acquisition part 33h. By contrast, in a case in which the processing of steps S61 through S66 is not completed by the time when the bidirectional response acquisition part 33h requests response data with RSID in step S72, the response data with RSID acquired in step S52 is stored in the cache 36a. That is, the spooler 36 transmits the response data with RSID that is unchanged from previous response data with RSID.

In step S73, the bidirectional response acquisition part 33h reads the response ID from the response ID storage part 33i. In step S74, the bidirectional response acquisition part 33h compares the response ID thus read with the response ID included in the response data with RSID retrieved in step S72.

In a case in which the two response IDs thus compared are different from each other, the bidirectional response acquisition part 33h determines that the response data is updated. In other words, the bidirectional response acquisition part 33h acquires the response data from the response data with RSID retrieved from the cache 36a. Then, the bidirectional response acquisition part 33h acquires the response data (i.e., apparatus information) from the response data with RSID, and displays the apparatus information thus acquired with the UI display section 33b in step S81. For example, the UI display section 33b displays the display screen 103 described above with reference to FIG. 11 with the display device 6.

By contrast, in a case in which the two response IDs thus compared are the same, the bidirectional response acquisition part 33h determines not to acquire the response data from the response data with RSID. Then, the bidirectional response acquisition part 33h stands by for another predetermined period of time in step S91.

After standing by for another predetermined period of time in step S91, the bidirectional response acquisition part 33h requests response data with RSID from the spooler 36 in step S92. In response to the request, the spooler 36 transmits the response data with RSID. The bidirectional response acquisition part 33h reads the response ID from the response ID storage part 33i in step S93. In step S94, the bidirectional response acquisition part 33h compares the response ID thus read with the response ID included in the response data with RSID retrieved in step S92.

When the two response IDs thus compared are different from each other, the bidirectional response acquisition part 33h determines that the response data is updated. Then, the bidirectional response acquisition part 33h acquires the response data (i.e., apparatus information) from the response data with RSID, and displays the apparatus information thus acquired with the UI display section 33b in step S81R. By contrast, when the two response IDs are the same, the bidirectional response acquisition part 33h repeats the processing of steps S91 through S94 until the response IDs differs from each other.

As described above, in the printing system 10A of the second embodiment, the bidirectional script 37 generates a response ID upon receiving response data (i.e., apparatus information) from the printer 2, and then generates response data with RSID. Thereafter, the bidirectional script 37 stores the response data with RSID in the cache 36a of the spooler 36. Meanwhile, the bidirectional response acquisition part 33h acquires cache data from the cache 36a, and stores, in the response ID storage part 33i, a response ID included in response data with RSID (i.e., cache data). Thereafter, the bidirectional response acquisition part 33h compares a response ID of new response data with RSID, which is retrieved from the cache 36a after the cache data is retrieved therefrom, with the response ID stored in the response ID storage part 33i. When the response ID stored in the response ID storage part 33i does not match the response ID of the new response data with RSID, the bidirectional response acquisition part 33h determines that the response data is updated, and acquires the response data from the new response data with RSID.

As a consequence, a response to a bidirectional request is acquired as in synchronous communication. Therefore, even when asynchronous bidirectional communication is performed between the printer 2 and the computer 1A, the computer 1A acquires desired apparatus information from the printer 2.

In addition, in the second embodiment, bidirectional communication is allowed for, e.g., a user not authorized to access the QueuePropertyBag 35b described above in the first embodiment.

Modifications

In the first embodiment described above, the bidirectional communication section 33c compares the request ID stored in the accessible area 35 with the request ID included in the response data with RQID in step S33. Alternatively, for example, the bidirectional communication section 33c may include a cache to store the request ID generated in the processing of step S12. In a case in which the bidirectional communication section 33c includes a cache, the bidirectional communication section 33c may compare the request ID stored in the cache with the request ID included in the response data with RQID in step S33.

In the second embodiment described above, the response ID is stored as temporary data in the cache 36a, which is a volatile memory, of the spooler 36. Alternatively, for example, the bidirectional script 37 may store the response ID as a data file in a non-volatile memory. In a case in which the bidirectional script 37 stores the response ID as a data file in a non-volatile memory, the response ID retains even after completion of a series of processes starting from step S51. Therefore, the response ID may be stored after the comparison process in step S74 or the comparison process in step S94, for example.

In the first embodiment described above, the request ID is stored in the QueuePropertyBag 35b of the accessible area 35. Alternatively, the request ID may be stored in a storage area other than the QueuePropertyBag 35b provided that the bidirectional communication section 33c is capable of reading the request ID from the storage area and writing the request ID in the storage area, and that the bidirectional script 37 is capable of reading the request ID from the storage area.

In the embodiments described above, the printer 2 is described as an inkjet printer, but is not limited thereto. For example, the printer 2 may be an electrophotographic printer.

In the embodiments described above, the printer 2 is exemplified as a peripheral apparatus connected to the computer 1 or the computer 1A. However, the peripheral apparatus is not limited to the printer 2. For example, the peripheral apparatus may be an apparatus that performs processing related to image formation, such as a multifunction peripheral, a copier, a scanner, a digital still camera, a projector, or an electronic blackboard.

In the embodiments described above, the printing systems 10 and 10A are exemplified as systems to which the embodiments of the present disclosure are applicable. Specifically, the first embodiment exemplifies the printing system 10 that includes the computer 1 as an information processing apparatus and the printer 2 as an image processing apparatus as described above. The second embodiment exemplifies the printing system 10A that includes the computer 1A as an information processing apparatus and the printer 2 as an image processing apparatus as described above. However, the system is not limited to the printing system 10 or the printing system 10A. For example, the system may be an image processing system that performs processing related to image processing.

Aspects and Advantages of Embodiments of the Present Disclosure

The embodiments described above are one example and attain advantages below in a plurality of aspects.

<First Aspect>

According to the present aspect, an information processing apparatus (e.g., computer 1, computer 1A) acquires status information (e.g., apparatus information) from an image processing apparatus (e.g., printer 2). The status information indicates a status of the image processing apparatus. The information processing apparatus includes a memory (e.g., cache 36a of the spooler 36), a requester (e.g., UI display section 33b), a storage controller (e.g., bidirectional script 37), a retriever (e.g., bidirectional communication section 33c, bidirectional response acquisition part 33h), a determiner (e.g., bidirectional communication section 33c, bidirectional response acquisition part 33h), and a displayer (e.g., UI display section 33b). The requester sends a request for the status information to the image processing apparatus (e.g., steps S11, S51). The storage controller acquires the status information from the image processing apparatus in response to the request by the requester, and stores, in the memory, the status information acquired, in association with identification information (e.g., response data with RQID/RSID) (e.g., steps S23, S26, S63, S66). The retriever retrieves the identification information from the memory at a predetermined time (e.g., when a standby time elapses) (e.g., steps S31, S32, S71, S72). The determiner (e.g., bidirectional communication section 33c, bidirectional response acquisition part 33h) determines whether the identification information retrieved satisfies a certain condition (e.g., steps S33, S74). For example, the determiner determines whether two request IDs are the same, or whether two response IDs differ from each other. Based on a determination that the identification information retrieved satisfies the certain condition, the determiner provides the requester with the status information acquired. The requester, as a displayer, displays, on a display (e.g., display device 6), the status information thus provided (e.g., steps S41, S81).

In the present aspect, the memory stores the status information and the identification information of the status information in association with each other. The determiner determines whether or not to acquire the status information based on the identification information retrieved by the retriever. Accordingly, even when asynchronous communication is performed between the information processing apparatus and the image processing apparatus, the information processing apparatus acquires desired status information from the image processing apparatus.

<Second Aspect>

In the information processing apparatus (e.g., computer 1, computer 1A) according to the present aspect, the retriever retrieves again the identification information from the memory at another predetermined time based on a determination that the identification information retrieved does not satisfy the certain condition (e.g., steps S34, S35, S91, S92). For example, in response to two request IDs differing from each other, or in response to two response IDs being the same, the retriever retrieves again the identification information (e.g., request ID/response ID) from the memory when another standby time elapses.

In the present aspect, even when the identification information (e.g., request ID/response ID) retrieved from the memory does not satisfy the certain condition, new identification information is thereafter stored in the memory in association with new status information. In response to two request IDs being the same, or in response to two response IDs differing form each other, the information processing apparatus acquires desired status information from the image processing apparatus.

<Third Aspect>

According to the present aspect, the information processing apparatus (e.g., computer 1, computer 1A) further includes a first identification information generator (e.g., bidirectional communication section 33c). The first identification information generator generates request identification information (e.g., request ID) for identifying the request by the requester (e.g., step S12). The storage controller stores, in the memory, the request identification information generated as the identification information in association with the status information acquired in response to the request (e.g., step S26). In response to the identification information retrieved from the memory when the standby time elapses matching the request identification information generated by the first identification information generator, the determiner (e.g., bidirectional communication section 33c) determines that the identification information retrieved satisfies the certain condition, and provides the requester with the status information acquired (e.g., step S33). The requester, as the displayer, displays the status information thus provided (e.g., step S41).

In the present aspect, in response to the two pieces of identification information (e.g., request IDs) being the same, the determiner determines that the status information associated with the identification information is the status information to be acquired. By contrast, in response to the two pieces of identification information (e.g., request IDs) differing from each other, the determiner determines that the status information associated with the identification information is not the status information to be acquired. Accordingly, even when asynchronous bidirectional communication is performed between the information processing apparatus and the image processing apparatus, the information processing apparatus acquires the desired status information from the image processing apparatus.

<Fourth Aspect>

According to the present aspect, the information processing apparatus (e.g., computer 1) further includes an identification information memory (e.g., QueuePropertyBag 35b of accessible area 35). The first identification information generator (e.g., bidirectional communication section 33c) is further configured to store the request identification information in the identification information memory (e.g., step S13). The storage controller (e.g., bidirectional script 37) and the determiner (e.g., bidirectional communication section 33c) are capable of reading information from the identification information memory.

In the present aspect, the identification information is indirectly transmittable between the determiner and the storage controller via the identification information memory.

<Fifth Aspect>

In the information processing apparatus (e.g., computer 1) according to the present aspect, the first identification information generator (e.g., bidirectional communication section 33c) generates the request identification information with a random value per request by the requester (e.g., step S12).

In the present aspect, the identification information is generated with a random value each time the requester outputs a request. Accordingly, the information processing apparatus reliably acquires desired status information from the image processing apparatus.

<Sixth Aspect>

According to the present aspect, the information processing apparatus (e.g., computer 1A) further includes a second identification information generator (e.g., bidirectional script 37), an identification information storage controller (e.g., bidirectional response acquisition part 33h), and an identification information memory (e.g., response ID storage part 33i). The second identification information generator generates response identification information (e.g., response ID) for identifying the status information, in response to acquisition of the status information that is sent from the image processing apparatus in response to the request by the requester (e.g., step S64). The identification information storage controller retrieves the identification information stored in the memory in association with the status information acquired, from the memory, in response to the request by the requester (e.g., step S53). The identification information storage controller stores, in the identification information memory, the identification information retrieved from the memory (e.g., step S54). The storage controller stores, in the memory, the response identification information generated in association with the status information acquired (e.g., step S66). The identification information storage controller retrieves the response identification information from the memory when the standby time elapses (e.g., step S72). In response to the response identification information retrieved from the memory when the standby time elapses not matching the identification information stored in the identification information memory, the determiner (e.g., bidirectional response acquisition part 33h) determines that the response identification information retrieved satisfies the certain condition, and provides the requester with the status information acquired (e.g., step S74). The requester, as the displayer, displays the status information thus provided. (e.g., step S81).

In the present aspect, in response to the two pieces of identification information (e.g., response IDs) differing from each other, the determiner determines that the status information associated with the response identification information is the status information to be acquired. By contrast, in response to the two pieces of identification information (e.g., response IDs) being the same, the determiner determines that the status information associated with the response identification information is not the status information to be acquired. Accordingly, even when asynchronous bidirectional communication is performed between the information processing apparatus and the image processing apparatus, the information processing apparatus acquires the desired status information from the image processing apparatus.

<Seventh Aspect>

In the information processing apparatus (e.g., computer 1A) according to the present aspect, the second identification information generator generates the response identification information with a random value for each acquisition of the status information from the image processing apparatus (e.g., step S64).

In the present aspect, the identification information is generated with a random value each time the identification information generator acquires the status information from the image processing apparatus. Accordingly, the information processing apparatus reliably acquires desired status information from the image processing apparatus.

Although the present disclosure makes reference to specific embodiments, it is to be noted that the present disclosure is not limited to the details of the embodiments described above. Thus, various modifications and enhancements are possible in light of the above teachings, without departing from the scope of the present disclosure. It is therefore to be understood that the present disclosure may be practiced otherwise than as specifically described herein. For example, elements and/or features of different embodiments may be combined with each other and/or substituted for each other within the scope of the present disclosure. The number of constituent elements and their locations, shapes, and so forth are not limited to any of the structure for performing the methodology illustrated in the drawings.

Each of the functions of the described embodiments may be implemented by one or more processing circuits or circuitry. Processing circuitry includes a programmed processor, as a processor includes circuitry. A processing circuit also includes devices such as an application-specific integrated circuit (ASIC), digital signal processor (DSP), field programmable gate array (FPGA) and conventional circuit components arranged to perform the recited functions.

Any one of the above-described operations may be performed in various other ways, for example, in an order different from that described above.

Further, any of the above-described devices or units can be implemented as a hardware apparatus, such as a special-purpose circuit or device, or as a hardware/software combination, such as a processor executing a software program.

Further, as described above, any one of the above-described and other methods of the present disclosure may be embodied in the form of a computer program stored on any kind of storage medium. Examples of storage media include, but are not limited to, floppy disks, hard disks, optical discs, magneto-optical discs, magnetic tapes, nonvolatile memory cards, read only memories (ROMs), etc.

Alternatively, any one of the above-described and other methods of the present disclosure may be implemented by an application-specific integrated circuit (ASIC), prepared by interconnecting an appropriate network of conventional component circuits or by a combination thereof with one or more conventional general purpose microprocessors and/or signal processors programmed accordingly.

What is claimed is:

1. An information processing apparatus comprising:
a memory; and
processing circuitry configured to,
 send a request for status information to an image processing apparatus, the status information indicating a status of the image processing apparatus,
 acquire the status information from the image processing apparatus in response to the request,
 store, in the memory, the status information acquired, in association with identification information,
 retrieve the identification information from the memory on condition of a standby time elapsing,
 determine, based on the identification information, whether the status information associated with the identification information is responsive to the request for the status information, and
 on condition of determining that the status information is responsive to the request for the status information, display, on a display, a screen indicating the status of the image processing apparatus based on the status information.

2. The information processing apparatus according to claim 1,
wherein the processing circuitry is further configured to,
retrieve the identification information from the memory on condition of another standby time elapsing, and
determine that the status information is not responsive to the request for the status information based on the identification information associated with the status information retrieved on condition of the another standby time elapsing.

3. The information processing apparatus according to claim 1, wherein the processing circuitry is further configured to,
generate request identification information for identifying the request,
store, in the memory, the request identification information generated as the identification information in association with the status information acquired in response to the request, and
determine, on condition of the requested identification information matching the identification information in association with the status information, that the status information is responsive to the request for the status information.

4. The information processing apparatus according to claim 3, wherein,
the information processing apparatus includes
an identification information memory from which information is readable by the processing circuitry, and the processing circuitry is further configured to store the request identification information in the identification information memory in addition to the memory.

5. The information processing apparatus according to claim 3, wherein the processing circuitry is further configured to generates the request identification information with a random value per request.

6. The information processing apparatus according to claim 1, wherein,
the information processing apparatus includes an identification information memory, and
the processing circuitry is further configured to,
generate response identification information for identifying the status information, in response to acquisition of the status information that is sent from the image processing apparatus in response to the request,
retrieve the identification information stored in the memory in association with the status information acquired, from the memory in response to the request,
store, in the identification information memory; the identification information retrieved from the memory,
stores, in the memory, the response identification information generated in association with the status information acquired,
retrieves the response identification information from the memory on condition of the standby time elapsing, and
determine, on condition of the response identification information differing from the identification information in association with the status information, that the status information is responsive to the request for the status information.

7. The information processing apparatus according to claim 6, wherein the processing circuitry is further configured to generates the response identification information with a random value for each acquisition of the status information from the image processing apparatus.

8. A method for processing information, comprising:
sending a request for status information to an image processing apparatus, the status information indicating a status of the image processing apparatus;
acquiring the status information from the image processing apparatus in response to the request;
storing, in a memory, the status information acquired, in association with identification information;
retrieving the identification information from the memory on condition of a standby time elapsing;
determining, based on the identification information, whether the status information associated with the identification information is responsive to the request for the status information; and
on condition of determining that the status information is responsive to the request for the status information, displaying, on a display, a screen indicating the status of the image processing apparatus based on the status information.

9. The method for processing information according to claim 8,
further comprising:
retrieving the identification information from the memory on condition of another standby time elapsing; and
determining whether the status information is responsive to the request based on the identification information associated with the status information retrieved on condition of the another standby time elapsing.

10. The method for processing information according to claim 8, further comprising:
generating request identification information for identifying the request, wherein
the storing further includes the request identification information generated as the identification information in association with the status information acquired in response to the request; and
determining that the status information associated with the identification information is responsive to the request for the status information is on condition of matching the identification information retrieved from the memory on condition of the standby time elapsing and the request identification information.

11. The method for processing information according to claim 10, further comprising: storing the request identification information in an identification information memory from which information is readable, in addition to the memory.

12. The method for processing information according to claim 10, further comprising: generating a random value for the request identification information.

13. The method for processing information according to claim 8, further comprising:
generating response identification information for identifying the status information, in response to acquisition of the status information that is sent from the image processing apparatus in response to the request;
retrieving the identification information stored in the memory in association with the status information acquired, from the memory in response to the request;
storing, in an identification information memory, the identification information retrieved from the memory;
storing, in the memory, the response identification information generated in association with the status information acquired;
retrieving the response identification information from the memory on condition of the standby time elapsing; and
determining that the status information associated with the identification information responsive to the request for the status information is on condition of the response identification information retrieved from the memory differing from the identification information stored in the identification information memory.

14. The method for processing information according to claim 13,
further comprising: generating a random value for each acquisition of the status information from the image processing apparatus.

15. A non-transitory computer-readable storage medium storing a computer-readable product that causes an information processing apparatus to by:
sending a request for status information to an image processing apparatus, the status information indicating a status of the image processing apparatus;
acquiring the status information from the image processing apparatus in response to the request; storing, in a memory, the status information in association with identification information; and
on condition of a standby time elapsing,
retrieving, from the memory, the status information acquired from the image processing apparatus,
determining, based on the identification information, whether the status information associated with the identification information is responsive to the request for the status information, and on condition of determining that the status information is responsive to the request for the status information, displaying, on a display, a screen indicating the status of the image processing apparatus based on the status information.

16. The non-transitory computer-readable storage medium according to claim 15, wherein the computer-readable product causes the information processing apparatus to, retrieve the identification information from the memory on condition of another standby time elapsing, and determine that the status information is responsive to the request for the status information is based on the identification information associated with the status information retrieved on condition of the another standby time elapsing.

17. The non-transitory computer-readable storage medium according to claim 15, wherein the computer-readable product causes the information processing apparatus to, process the information by generating request identification information for identifying the request, store, in the memory, the request identification information generated as the identification information in association with the status information acquired in response to the request, and determine that the status information is responsive to the request for the status information is on condition of matching the identification information and the request identification information.

18. The non-transitory computer-readable storage medium according to claim 17, wherein the computer-readable product further causes the information processing apparatus to store the request identification information in an identification information memory from which information is readable, in addition to the memory.

19. The non-transitory computer-readable storage medium according to claim 17, wherein the computer-readable product further causes the infoi processing apparatus to generate a random value for each request identification information.

20. The non-transitory computer-readable storage medium according to claim 15, wherein the computer-readable product further causes the information processing apparatus to process the information to, generate response identification information for identifying the status information, in response to acquisition of the status information that is sent from the image processing apparatus in response to the request, retrieve the identification information stored in the memory in association with the status information acquired, from the memory in response to the request, and store, in an identification information memory, the identification information retrieved from the memory, store the response identification information generated in association with the status information, retrieve the response identification information from the memory occurs on condition of the standby time elapsing, and determine that the status information is responsive to the request for the status information on condition of the response identification information differing from the identification information stored in the identification information memory.

* * * * *